United States Patent
Kato (10) Patent No.: US 10,789,970 B2
(45) Date of Patent: Sep. 29, 2020

(54) RECEIVING DEVICE AND RECEIVING METHOD

(71) Applicant: PANASONIC INTELLECTUAL PROPERTY MANAGEMENT CO., LTD., Osaka (JP)

(72) Inventor: Kazuhiro Kato, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/711,820

(22) Filed: Dec. 12, 2019

(65) Prior Publication Data

US 2020/0194024 A1 Jun. 18, 2020

(30) Foreign Application Priority Data

Dec. 12, 2018 (JP) .................. 2018-232285

(51) Int. Cl.

| H04B 15/00 | (2006.01) |
|---|---|
| G10L 21/0232 | (2013.01) |
| H04R 3/04 | (2006.01) |
| H04B 1/16 | (2006.01) |
| G10L 25/18 | (2013.01) |
| H04H 40/72 | (2008.01) |
| G10L 25/51 | (2013.01) |

(52) U.S. Cl.
CPC .......... *G10L 21/0232* (2013.01); *G10L 25/18* (2013.01); *G10L 25/51* (2013.01); *H04B 1/1676* (2013.01); *H04H 40/72* (2013.01); *H04R 3/04* (2013.01)

(58) Field of Classification Search
CPC ..... G10L 21/0232; G10L 25/51; G10L 25/18; H04B 1/1676; H04R 3/04
See application file for complete search history.

(56) References Cited

U.S. PATENT DOCUMENTS

| 4,042,883 A | 8/1977 | Rae |
| 4,761,829 A | 8/1988 | Lynk, Jr. et al. |
| 5,371,803 A * | 12/1994 | Williamson, III ... H03G 3/3015 381/101 |

(Continued)

FOREIGN PATENT DOCUMENTS

JP 63-085929 6/1988

*Primary Examiner* — Simon King
(74) *Attorney, Agent, or Firm* — Greenblum & Bernstein, P.L.C.

(57) ABSTRACT

A receiving device includes: a receiver which receives a broadcast signal including an audio signal and obtains a baseband signal of a received signal; a demodulator which obtains the audio signal by demodulating the baseband signal; a middle frequency range detector which detects a signal level of a middle frequency component in a frequency range of the baseband signal; a high frequency range detector which detects a signal level of a high frequency component in the frequency range of the baseband signal; and a processing circuit which sets an effect amount of high-cut processing based on a level difference between the signal level of the middle frequency component and the signal level of the high frequency component. The receiving device further includes a high-cut filtering device which performs the high-cut processing on the audio signal in accordance with a set value of the effect amount.

10 Claims, 6 Drawing Sheets

(56) References Cited

U.S. PATENT DOCUMENTS

| | | | | |
|---|---|---|---|---|
| 5,550,925 | A | * | 8/1996 | Hori ........................ H03G 5/165 |
| | | | | 381/98 |
| 5,933,506 | A | * | 8/1999 | Aoki ........................ H04R 1/46 |
| | | | | 381/122 |
| 1,034,917 | A1 | | 7/2019 | Potereau |
| 2002/0196863 | A1 | * | 12/2002 | Kaku .................. H04L 27/2624 |
| | | | | 375/285 |
| 2013/0085752 | A1 | * | 4/2013 | Kawashima ............ G10L 19/22 |
| | | | | 704/225 |

\* cited by examiner

RECEIVING DEVICE AND RECEIVING METHOD

FIELD

The present disclosure relates to a receiving device and a receiving method for receiving a wireless signal such as FM broadcast waves.

BACKGROUND

In the receiving devices for receiving radio broadcasts such as FM broadcasts, high-cut processing for attenuating a high-frequency component of an audio signal obtained by demodulating a received signal is performed to reduce noise. In the high-cut processing, not only noise but also a high-frequency component of an audio signal is attenuated. When a radio broadcast is received, excessive attenuation of a high-frequency component of an audio signal by high-cut processing may change even the tune of music or else of the broadcast.

For example, JP-U-S63-85929 discloses a technique of restricting reproduction of an audio signal in a low-frequency range and a high-frequency range in accordance with an output signal of a pulse noise detection circuit.

SUMMARY

A high-frequency component of an audio signal extracted from a received signal of a radio broadcast is influenced by not only noise but also information contained in the audio signal originally, thermal noise occurring in a receiving device, and other things. Thus, in techniques of controlling the attenuation amount of a high-frequency component in accordance with a result of detection of a high-frequency signal level as in the technique disclosed in JP-U-S63-85929, there may occur a case that the attenuation amount cannot be controlled in such a manner as to be suitable for the frequency characteristic of an original audio signal. This results in a problem that the tune of music, for example, of a radio broadcast is changed, resulting in lowering of sound quality as recognized by the human auditory sense contrary to the intention.

The present disclosure is made in view of the above circumstances, and an object of the disclosure is to provide a receiving device and a receiving method capable of realizing high-cut processing for reducing noise while suppressing influence on sound quality.

The disclosure provides a receiving device including: a receiver which receives a broadcast signal including an audio signal and obtains a baseband signal of a received signal; a demodulator which obtains the audio signal by demodulating the baseband signal; a middle frequency range detector which detects a signal level of a middle frequency component in a frequency range of the baseband signal; a high frequency range detector which detects a signal level of a high frequency component in the frequency range of the baseband signal; a processing circuit which sets an effect amount of high-cut processing based on a level difference between the signal level of the middle frequency component and the signal level of the high frequency component; and a high-cut filtering device which performs the high-cut processing on the audio signal in accordance with a set value of the effect amount.

The disclosure also provides a receiving method in a receiving device which receives a broadcast signal including an audio signal, the receiving method including: receiving the broadcast signal and obtaining a baseband signal of a received signal; obtaining the audio signal by demodulating the baseband signal; detecting a signal level of a middle frequency component in a frequency range of the baseband signal; detecting a signal level of a high frequency component in the frequency range of the baseband signal; setting an effect amount of high-cut processing based on a level difference between the signal level of the middle frequency component and the signal level of the high frequency component by a processing circuit; and performing the high-cut processing on the audio signal in accordance with a set value of the effect amount by a high-cut filtering device.

The disclosure realizes high-cut processing for reducing noise while suppressing influence on sound quality.

DETAILED DESCRIPTION

A receiving device and a receiving method according to a specific embodiment of the present disclosure will be hereinafter described in detail by referring to the drawings when necessary. However, unnecessarily detailed descriptions may be omitted. For example, a detailed description of an already well-known item and a redundant description of a structure, a configuration, or the like that is substantially the same as one already described may be omitted. This is to prevent the following description from becoming unnecessarily redundant and to facilitate its understanding by those skilled in the art. The accompanying drawings and the following description are provided to allow those skilled in the art to understand the disclosure sufficiently and are not intended to restrict the subject matter described in the claims.

In the embodiment, an example configuration that is suitable for a radio receiver for reception of FM broadcasts will be described as an example receiving device and receiving method according to the disclosure.

Although the following description will be made an example of application to a radio receiver for reception of FM broadcasts, the application field is not limited to it and include radio receivers for AM broadcasts as well as various kinds of, that is, vehicular, stationary, portable, or like, receiving devices.

Figure 1:
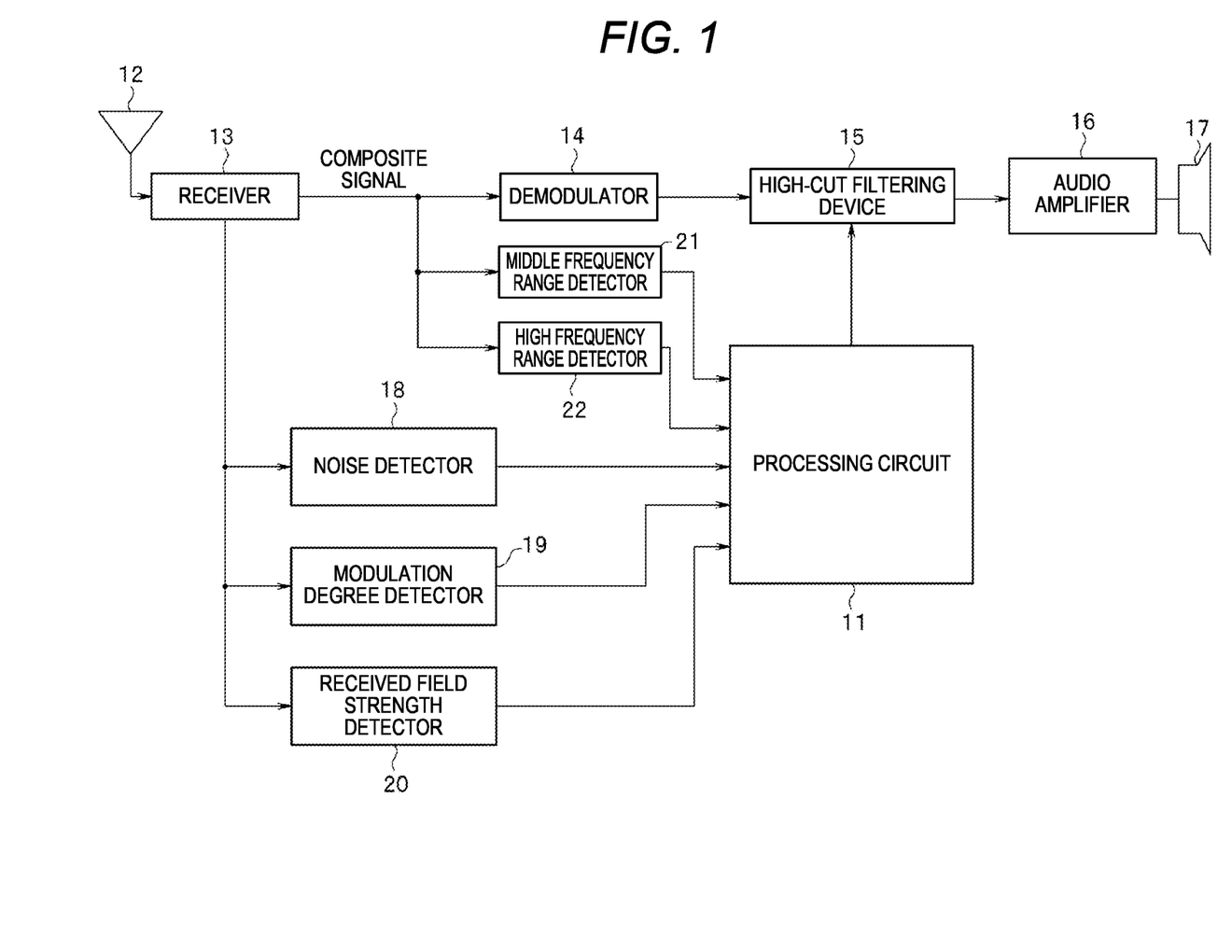
FIG. 1 is a block diagram showing an example configuration of a receiving device according to an embodiment.

FIG. 1 is a block diagram showing an example configuration of the receiving device according to the embodiment. The receiving device is mainly composed of a processing circuit 11, an antenna 12, a receiver 13, a demodulator 14, a high-cut filtering device 15, an audio amplifier 16, a speaker 17, a noise detector 18, a modulation degree detector 19, a received field strength detector 20, a middle frequency range detector 21, and a high frequency range detector 22.

The processing circuit 11, which is a processor such as a CPU (central processing unit), an FPGA (field programmable gate array), or a DSP (digital signal processor), performs processing that relates to an operation of each part of the receiving device. The processing circuit 11 may be either one that operates in accordance with programs stored in a memory (not shown) or one all or part of whose functions are implemented by hardware. The processing circuit 11 has a function of controlling high-cut processing of the high-cut filtering device 15.

The antenna 12 is an antenna for receiving a wireless signal of broadcast waves or the like. For example, a wireless signal of an FM radio broadcast is induced in the antenna 12. The receiver 13 extracts a baseband signal of a desired channel from an FM broadcast signal by performing frequency conversion etc. on a radio-frequency wireless signal received by the antenna 12. For example, the receiver 13 extracts an FM broadcast signal of a desired channel from FM broadcast signals in a radio frequency band induced in the antenna 12 and obtains a baseband composite signal. The receiver 13 outputs the composite signal to the demodulator 14.

When the FM broadcast signal is received, the demodulator 14 demodulates the composite signal which includes an L+R signal and an L-R signal. For example, the demodulator 14 is configured so as to restore stereo audio signals by demodulating a composite signal. The demodulator 14 outputs the demodulated stereo audio signals to the high-cut filtering device 15. Where the FM broadcast signal is for transmission of a monaural audio signal, the demodulator 14 demodulates the monaural audio signal and outputs a resulting audio signal to the high-cut filtering device 15. That is, the demodulator 14 is configured so as to output a demodulated baseband audio signal(s) to the high-cut filtering device 15.

For example, the high-cut filtering device 15 has a high-cut filter (not shown) for attenuating a high-frequency component of an audio signal and a controller (not shown) configured to control the attenuation amount of the high-cut filter. Receiving an instruction as to an attenuation amount of the high-cut filter from the processing circuit 11, the high-cut filtering device 15 attenuates a high-frequency component of the received audio signal by the instruction attenuation amount and outputs a resulting audio signal to the audio amplifier 16.

The audio amplifier 16 amplifies the audio signal received from the high-cut filtering device 15 and outputs the amplified audio signal to the speaker 17. The speaker 17, which is an example sound output device, reproduces and outputs, as a sound, the received audio signal.

In the embodiment, a feature, in particular, tune, of an audio signal is judged on the basis of a result of comparison between a middle frequency component and a high frequency component and the effect amount of the high-cut processing, that is, the high frequency component attenuation amount of the high-cut processing, is controlled on the basis of the judgment result. This enables high-cut processing for attenuating noise while preventing degradation of tune as recognized by the human auditory sense.

The receiver 13 also outputs the baseband signal of the received FM broadcast signal to the middle frequency range detector 21 and the high frequency range detector 22. For example, the receiver 13 may output an L+R signal of a baseband composite signal to the middle frequency range detector 21 and the high frequency range detector 22.

The middle frequency range detector 21 is a band-pass filter that passes a middle frequency component, in the frequency range, of a baseband signal. The middle frequency range detector 21 detects a frequency component (middle frequency component) in a middle frequency range of an audio signal transmitted in the form of FM broadcast waves. The high frequency range detector 22 is a band-pass filter that passes a high frequency component, in the frequency range, of a baseband signal. The high frequency range detector 22 detects a frequency component (high frequency component) in a high frequency range of an audio signal transmitted in the form of FM broadcast waves. When receiving an L+R signal, the middle frequency range detector 21 and the high frequency range detector 22 extract a middle frequency component and a high frequency component, respectively, of the received L+R signal.

When FM broadcast waves are to be received, for example, the audio signal of a transmitted FM broadcast signal is in a frequency range of about 50 Hz to 15 kHz in which the middle frequency component is in about 300 Hz to 3 kHz and the high frequency component is in about 4 kHz to 15 kHz. In this case, the middle frequency range detector 21 may be, for example, a band-pass filter that passes a middle frequency component, that is, has a center frequency 700 Hz and a passband of 300 Hz to 3 kHz. The high frequency range detector 22 may be, for example, a band-pass filter that passes a high frequency component, that is, has a center frequency 9 kHz and a passband of 4 kHz to 15 kHz.

Figure 2:
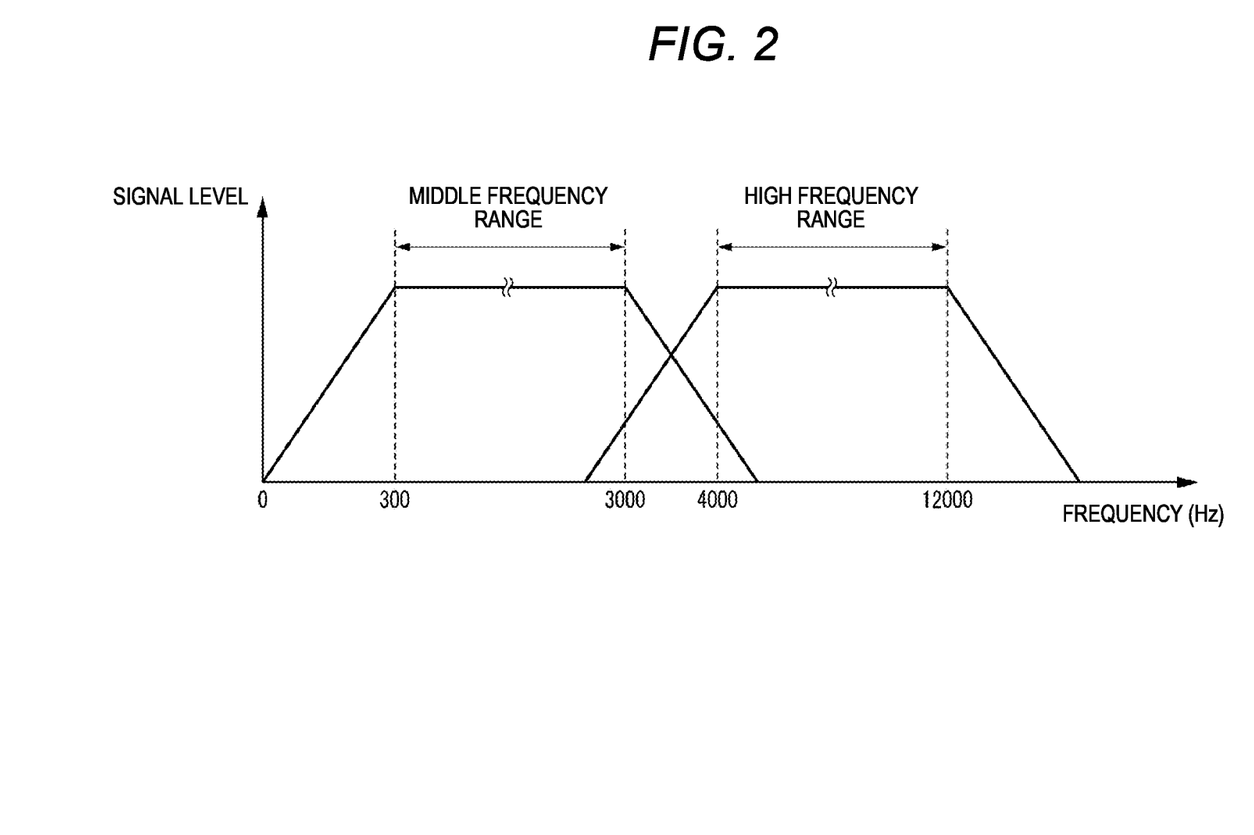
FIG. 2 is a characteristic diagram showing example pass characteristics of a middle frequency range detector and a high frequency range detector employed in the embodiment.

FIG. 2 is a characteristic diagram showing example pass characteristics of the middle frequency range detector 21 and the high frequency range detector 22 employed in the embodiment. In FIG. 2, the horizontal axis represents the frequency and the vertical axis represents the signal level. The middle frequency range detector 21 detects a middle frequency component by passing a component in a frequency range of, for example, 300 Hz to 3 kHz of a baseband signal in a frequency range of 50 Hz to 15 kHz and outputs a detection result to the processing circuit 11. The high frequency range detector 22 detects a high frequency component by passing a component in a frequency range of, for example, 4 kHz to 15 kHz of a baseband signal in the frequency range of 50 Hz to 15 kHz and outputs a detection result to the processing circuit 11.

A description will now be made of tune of an audio signal in judging the tune as its feature in the case where the audio signal is a musical signal. In general, an audio signal of music such as classic music has a frequency characteristic that the signal level is relatively high in the middle frequency range and in the high frequency range the signal level lowers as the frequency increases. In this specification, the tune of an audio signal of such music as classic music will be referred to as "middle-frequency-range-type tune." On the other hand, an audio signal of such music as pop music has a frequency characteristic that not only is the signal level high in the middle frequency range but also the signal level is kept high to a relatively high frequency in the high frequency range. In this specification, the tune of an audio signal of such music as pop music will be referred to as "high-frequency-range-type tune."

If the effect amount of high-cut processing (i.e., the attenuation amount of the high-cut filtering device 15) is set high to reduce noise in dealing with an audio signal having high-frequency-range-type tune, there may occur an event that high-frequency musical sound components are also attenuated, whereby the tune is changed and the sound quality as recognized by the human auditory sense is degraded. On the other hand, if the effect amount of high-cut processing is set low in dealing with an audio signal having middle-frequency-range-type tune, there may occur an event that the ratio of noise components to musical sound components is made large in the high-frequency range, whereby the sound quality as recognized by the human auditory sense is degraded.

In view of the above, in the embodiment, tune as a feature of an audio signal being transmitted is judged by comparing signal levels of a middle frequency component and a high frequency component of a baseband signal including a received audio signal and determining their difference. Since pop music having high-frequency-range-type tune and classic music having middle-frequency-range-type tune are different from each other in the type of a musical piece, it can be said that judgment of tune is also judgment of a type of a musical piece of an audio signal being transmitted. Although this example employs, as tune of a musical signal, tune corresponding to a feature of a musical piece, the disclosure is not limited to this case; a category that exhibits a feature of any of various kinds of audio signals such as audio signals of an announcement sound and other acoustic signals.

To judge tune of a received FM broadcast signal, the middle frequency range detector 21 outputs a result of the detection of a middle frequency component of the baseband signal including the audio signal to the processing circuit 11. The high frequency range detector 22 outputs a result of the detection of a high frequency component of the baseband signal including the audio signal to the processing circuit 11.

The processing circuit 11 judges a feature (i.e., tune of a musical piece) of the received audio signal on the basis of a difference between signal levels of the middle frequency component and the high frequency component. For example, the processing circuit 11 compares the difference between the signal levels of the middle frequency component and the high frequency component calculated from the baseband signal including the audio signal with a preset, prescribed threshold value. Based on a result of the comparison, the processing circuit 11 judges whether the type of the musical piece of the audio signal being transmitted is of middle-frequency-range-type tune (i.e., the musical piece is like a classic one) or of high-frequency-range-type tune (i.e., the musical piece is like a pop one).

If the type of the musical piece is of middle-frequency-range-type tune, it is considered that the high frequency component of the audio signal being transmitted includes noise components at a large proportion. If the type of the musical piece is of high-frequency-range-type tune, it is considered that the high frequency component of the audio signal being transmitted includes musical sound components at a large proportion. Thus, if judging that the audio signal has middle-frequency-range-type tune, the processing circuit 11 controls the high-cut filtering device 15 so that the effect amount of high-cut processing is increased. If judging that the audio signal has high-frequency-range-type tune, the processing circuit 11 controls the high-cut filtering device 15 so that the effect amount of high-cut processing is decreased.

In the case of an audio signal such as of pop music having high-frequency-range-type tune, since the signal levels of high-frequency musical sound components are sufficiently high, a user of the receiving device would not be annoyed much by noise even if the effect amount of high-cut processing is decreased. On the other hand, in the case of an audio signal such as of classic music having middle-frequency-range-type tune, since the proportion of musical sound components contained in the high frequency range is low, the user of the receiving device would not feel a large signal level drop in the high-frequency range and would rather feel a sound quality improving effect in the high-frequency range even if the effect amount of high-cut processing is set high.

For example, if the signal level of the high-frequency component is lower than that of the middle frequency component by only a small value (N dB), the processing circuit 11 judges that the audio signal being transmitted has high-frequency-range-type tune. If the signal level of the high-frequency component is lower than that of the middle frequency component by a large value (M dB), the processing circuit 11 judges that the audio signal being transmitted has middle-frequency-range-type tune. The high-frequency component signal level decrease M dB of middle-frequency-range-type tune is larger than the high-frequency component signal level decrease N dB of high-frequency-range-type tune (N<M). A threshold value A dB for judging the level difference between the middle frequency component and the high frequency component is set so as to satisfy a relationship $0 \leq N < A \leq M$. The processing circuit 11 judges that the audio signal being transmitted has high-frequency-range-type tune if the signal level of the high-frequency component is lower than that of the middle frequency component by a value that is smaller than A dB, and judges that the audio signal being transmitted has middle-frequency-range-type tune if the signal level of the high-frequency component is lower than that of the middle frequency component by a value that is larger than or equal to A dB. As for typical values of the level difference for tune judgment, 5 dB and 20 dB, for example, may be employed as N dB corresponding to high-frequency-range-type tune and M dB corresponding to middle-frequency-range-type tune, respectively. The threshold value and the typical values (set values) for tune judgment may be changed as appropriate.

The processing circuit 11 adjusts the effect amount of high-cut processing by controlling the attenuation amount of the high-cut filtering device 15 in accordance with the tune of the audio signal. That is, the processing circuit 11 suppresses sound quality reduction while eliminating noise by increasing the effect amount of high-cut processing when the proportion of noise components in the high-frequency component of the audio signal being transmitted is large and decreasing the effect amount of high-cut processing when the proportion of musical sound components in the high-frequency component of the audio signal being transmitted is small.

To simplify the description, a description will be made of an example in which the effect amount of high-cut processing is controlled by judging whether the audio signal being transmitted by a broadcast has, as its feature, middle-frequency-range-type tune (classic music) or high-frequency-range-type tune (pop music). The effect amount of high-cut processing may be controlled as appropriate in accordance with the difference between signal levels of a middle frequency component and a high frequency component also for audio signals other than ones having one of the two kinds of tune exemplified above.

The above-described example is directed to the case that the receiving device receives an FM broadcast. In the case of receiving an AM broadcast, for example, 300 Hz to 700 Hz and 1 kHz to 4 kHz may be employed as frequency ranges of a middle frequency component and a high frequency component, respectively. In this case, the middle frequency range detector 21 may employ a filter having a center frequency 400 Hz and a pass band of 300 Hz to 700 Hz and the high frequency range detector 22 may employ a filter having a center frequency 2 kHz and a pass band of 1 kHz to 4 kHz.

The receiving device according to the embodiment controls high-cut processing using, additionally, information other than tune of an audio signal. To perform this control, the receiver 13 outputs a received signal of an FM broadcast signal of a prescribed channel received selectively to the noise detector 18, the modulation degree detector 19, and the received field strength detector 20.

In the embodiment, the function of each of the noise detector 18, the modulation degree detector 19, and the received field strength detector 20 is implemented by hardware. However, part or all of functions of the noise detector 18, the modulation degree detector 19, and the received field strength detector 20 may be implemented by software. For example, in case where the processing circuit 11 includes a hardware configuration including a processor (e.g., CPU) and a memory, part or all of functions of the noise detector 18, the modulation degree detector 19, and the received field strength detector 20 may be implemented when the processor of the processing circuit 11 executes the program stored in the memory of the processing circuit 11.

The modulation degree detector 19 detects the degree of modulation of the received signal received from the receiver 13 and outputs a detection result to the processing circuit 11.

In a broadcasting station, an FM modulator performs modulation processing so that an audio signal receives 100% modulation at the peak. A recorded audio signal is supplied to the FM modulator after its signal level is restricted by a limiter amplifier to avoid overmodulation. Thus, depending on the signal level of the recorded audio signal and the setting of the limiter amplifier, there may occur an event that the degree of modulation is so high as to cause a narrow dynamic range or so low as to cause a small S/N ratio.

Thus, in the high frequency component of an audio signal transmitted as part of an FM broadcast signal having a high degree of modulation, the proportion of musical sound components is considered to be large relative to that of noise components. Conversely, in the high frequency component of an audio signal transmitted as part of an FM broadcast signal having a low degree of modulation, the proportion of noise components is large relative to that of musical sound components. That is, when the degree of modulation is low, noise is conspicuous.

In view of the above, in the receiving device according to the embodiment is configured so that high-cut processing can be controlled utilizing the degree of modulation of a received signal. The processing circuit 11 judges the degree of modulation (i.e., high or low) of a received signal on the basis of an output of the modulation degree detector 19 and controls the effect amount of high-cut processing in accordance with the degree of modulation thus judged. The processing circuit 11 may control the high-cut filtering device 15 so that the effect amount of high-cut processing is made high to suppress noise when the degree of modulation is low and the effect amount of high-cut processing is decreased as the degree of modulation increases.

The received field strength detector 20 detects a received electric field strength of a received signal received by the receiver 13 using, for example, a CNR (carrier-to-noise ratio) and outputs a detection result to the processing circuit 11.

In general, in receiving devices, if, for example, the received electric field strength is low or the degree of interference is high, thermal noise is prone to occur inside the receiving device and the signal level of a high frequency component of an audio signal may be increased being affected by the thermal noise.

In view of the above, in the receiving device according to the embodiment is configured so that high-cut processing can be controlled utilizing the received electric field strength. The processing circuit 11 judges a received signal level (i.e., high or low) on the basis of an output of the received field strength detector 20 and controls the effect amount of high-cut processing in accordance with the received electric field strength. If the CNR is low due to a weak electric field or occurrence of interference, the processing circuit 11 may control the high-cut filtering device 15 so that the effect amount of high-cut processing is made high irrespective of the tune.

The noise detector 18 obtains a noise level by detecting multipath noise contained in the received signal of an FM broadcast signal received by the receiver 13. Where the received signal is of an AM broadcast signal, the noise detector 18 obtains a noise level by detecting noise contained in the received signal is of the AM broadcast signal. The noise detector 18 outputs information indicating the obtained noise level to the processing circuit 11.

When the noise level of a received signal is sufficiently low, there may occur a case that the risk of sound quality reduction by high-cut processing surpasses the advantage of sound quality enhancement or noise reduction by removal of noise by high-cut processing. In view of this, in the embodiment, whether to perform high-cut processing may be determined in accordance with the noise level of the received signal, that is, whether it is larger or smaller than a prescribed threshold value.

In this case, the processing circuit 11 judges the noise level (i.e., high or low) of the received signal on the basis of the output of the noise detector 18 and controls the effect amount of high-cut processing in accordance with the noise level. The processing circuit 11 may control the high-cut filtering device 15 so that it performs high-cut processing only when the noise level of the received signal is higher than a prescribed threshold value.

As described above, the processing circuit 11 controls the high-cut filtering device 15 by determining the effect amount of high-cut processing in accordance with the feature (tune) of the received audio signal on the basis of a middle frequency component detection result of the middle frequency range detector 21 and a high frequency component detection result of the high frequency range detector 22. It is possible for the processing circuit 11 to control the high-cut filtering device 15 by determining the effect amount of high-cut processing on the basis of at least one of a noise detection result of the noise detector 18, a degree-of-modulation detection result of the modulation degree detector 19, and a received electric field strength detection result of the received field strength detector 20 in addition to a feature of the audio signal.

The above-described detection by each of the noise detector 18, the modulation degree detector 19, the received field strength detector 20, the middle frequency range detector 21, and the high frequency range detector 22 may be made every prescribed cycle, when a reception broadcast station (reception channel) is switched, or when a broadcast program is switched. The processing circuit 11 may change the effect amount of high-cut processing when the manner of control is changed every prescribed cycle, for example. If a change of the degree of modulation is quick, the processing circuit 11 may perform a control of lowering the effect amount of high-cut processing for a prescribed time irrespective of the other detection results.

Figure 3:
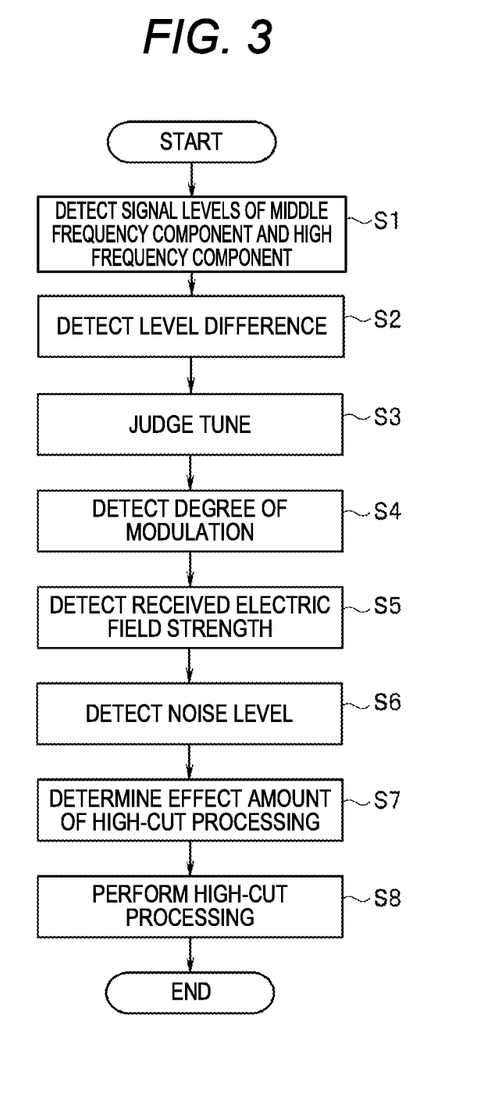
FIG. 3 is a process flowchart showing how high-cut processing according to the embodiment is performed.

Next, a process executed by the receiving device according to the embodiment will be described. FIG. 3 is a process flowchart showing how high-cut processing according to the embodiment is performed.

When the receiving device is powered on, FM broadcast signals in a radio frequency band received by the antenna 12 are input to the receiver 13. The receiver 13 selects an FM broadcast signal of a desired channel, for example, in response to a station selecting manipulation of a user, converts it into a baseband composite signal, and outputs it to the demodulator 14. The demodulator 14 restores L and R signals (audio signal) by demodulating the composite signal and outputs them to the high-cut filtering device 15.

The processing circuit 11 determines the effect amount of high-cut processing and instructs the high-cut filtering device 15 by outputting effect amount information to it. The high-cut filtering device 15 receives the effect amount information for high-cut processing from the processing circuit 11 and attenuates a high frequency component of the audio signal received from the demodulator 14 in accordance with the specified effect amount. As a result, multipath noise in the high frequency component is eliminated. The audio signal from which noise has been eliminated by the high-cut filtering device 15 is amplified by the audio amplifier 16 and output from the speaker 17. A sound of the audio signal of the received FM broadcast signal is reproduced from the speaker 17.

The receiving device executes the steps shown in FIG. 3 that relate to high-cut processing. The baseband signal including the audio signal obtained by the receiver 13 is also supplied to the middle frequency range detector 21 and the high frequency range detector 22. At step S1, the middle frequency range detector 21 and the high frequency range detector 22 detect signal levels of a middle frequency component and a high frequency component of the baseband signal and output detection results to the processing circuit 11, respectively.

At step S2, using the detection results of the middle frequency range detector 21 and the high frequency range detector 22, the processing circuit 11 calculates (detects) a difference (level difference) between the middle frequency component and the high frequency component. At step S3, the processing circuit 11 judges tune of the received audio signal on the basis of the level difference between the middle frequency component and the high frequency component of the baseband signal including the audio signal. For example, the processing circuit 11 judges whether the detected level difference is about N dB that is smaller than the prescribed value A dB or about M dB that is larger than or equal to the prescribed value A dB. The processing circuit 11 judges that the musical piece type is of high-frequency-range-type tune if the level difference is N dB, and judges that middle-frequency-range-type tune if the level difference is M dB.

The received signal of the FM broadcast signal received by the receiver 13 is also supplied to the noise detector 18, the modulation degree detector 19, and the received field strength detector 20. At step S4, the modulation degree detector 19 detects the degree of modulation of the received signal of the FM broadcast signal and outputs a detection result to the processing circuit 11.

At step S5, the received field strength detector 20 detects a received signal strength of the received signal of the FM broadcast signal using a CNR, for example, and outputs a detection result to the processing circuit 11. For example, the received field strength detector 20 detects a radio wave state that a detected received electric field level means a weak electric field and outputs a detection result "weak electric field state" to the processing circuit 11.

At step S6, the noise detector 18 detects a noise level of the received signal of the FM broadcast signal and outputs a detection result to the processing circuit 11. For example, the noise detector 18 detects multipath noise in the received signal and outputs a detection result to the effect that the noise level is higher than or equal to a prescribed value to the processing circuit 11.

At step S7, the processing circuit 11 sets the effect amount of high-cut processing in accordance with the tune judgment result that has been obtained on the basis of the difference between the levels of the middle frequency component and the high frequency component detected by the middle frequency range detector 21 and the high frequency range detector 22, and further in accordance with the degree of modulation detected by modulation degree detector 19 and the CNR detection result of the received field strength detector 20. Furthermore, the processing circuit 11 judges whether to perform high-cut processing on the basis of the noise detection result of the noise detector 18.

The processing circuit 11 determines the effect amount of high-cut processing in accordance with the above processing results and outputs an instruction as to the effect amount to the high-cut filtering device 15 (step S7). At step S8, the controller of the high-cut filtering device 15 controls the pass characteristic of the high-cut filter so as to obtain the effect amount specified by the processing circuit 11. In this manner, the high-cut filtering device 15 performs high-cut processing in accordance with the effect amount set by the processing circuit 11.

Figure 4:
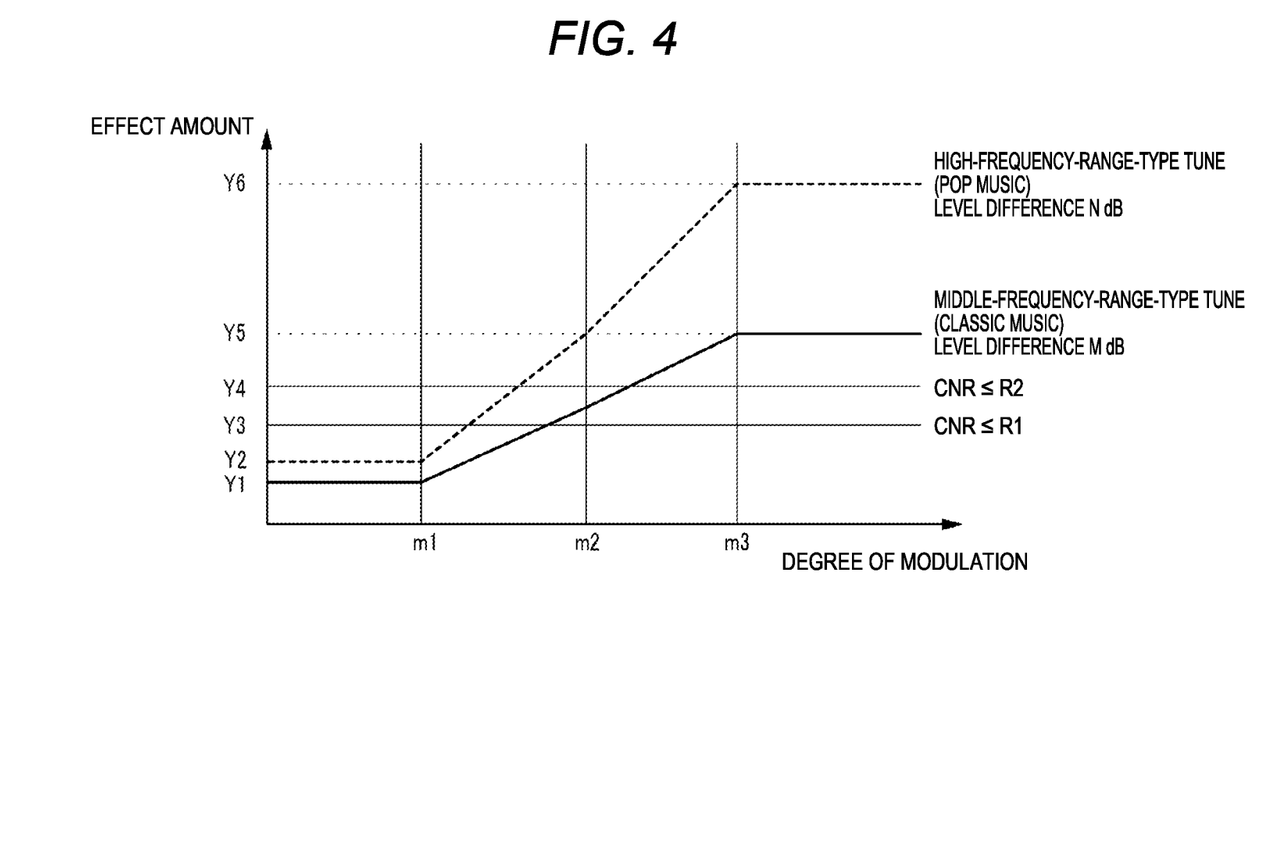
FIG. 4 is a characteristic diagram showing an example of how the effect amount of high-cut processing is set in the embodiment.

FIG. 4 is a characteristic diagram showing an example of how the effect amount of high-cut processing is set in the embodiment. In FIG. 4, the horizontal axis represents the degree of modulation and the vertical axis represents the effect amount of high-cut processing. FIG. 4 shows a specific example of how the effect amount of high-cut processing is set in accordance with the tune judgment result obtained on the basis of a level difference between a middle frequency component and a high frequency component, the degree of modulation judgment result, and the received electric field strength detection result. The effect amount (attenuation) of high-cut processing on the vertical axis of FIG. 4 is in dB and effect amount values Y1 to Y6 are negative decibel values having a relationship |Y1|>|Y2|>|Y3|>|Y4|>|Y5|>|Y6|. Thus, in this characteristic diagram, the effect amount value Y1 at the bottom is largest and hence the signal level of the high frequency component is lowered most. The effect amount value Y6 at the top is smallest and hence the signal level of the high frequency component is lowered least, that is, the signal level of the high frequency component is kept high.

In FIG. 4, the solid line represents a characteristic for a case of reception of an audio signal having middle-frequency-range-type tune (similar to tune of classic music; e.g., the level difference between the middle frequency component and the high frequency component is M dB) and the broke line represents a characteristic for a case of reception of an audio signal having high-frequency-range-type tune (similar to tune of pop music; e.g., the level difference between the middle frequency component and the high frequency component is N dB (N<M)).

As shown in FIG. 4, when an audio signal having middle-frequency-range-type tune is received, the effect amount of high-cut processing is set higher than when an audio signal having high-frequency-range-type tune is received. As a result, for an audio signal having middle-frequency-range-type tune like tune of classic music etc., noise can be eliminated sufficiently by high-cut processing and hence the sound quality can be enhanced. On the other hand, for an audio signal having high-frequency-range-type tune like tune of pop music etc., the effect amount of high-cut processing is set low, whereby the attenuation of musical sound components that have relatively high signal levels to a high frequency component including sounds of drums, cymbals, etc. is suppressed and hence the tune is not impaired.

Furthermore, the processing circuit 11 sets the effect amount of high-cut processing in accordance with the degree of modulation of the received signal. For example, the processing circuit 11 changes the effect amount of high-cut processing in accordance with the degree of modulation of the received signal. In this case, the processing circuit 11 may perform this control so as to decrease the effect amount of high-cut processing as the degree of modulation becomes lower, and increase the effect amount of high-cut processing as the degree of modulation becomes higher. Furthermore, for example, the processing circuit 11 may change the rate of variation of the effect amount of high-cut processing in accordance with the degree of modulation using degrees of modulation m1, m2, and m3 (m1<m2<m3) as threshold values.

For example, in the example of FIG. 4, the effect amount of high-cut processing is kept constant in a degree-of-modulation range that is lower than or equal to m1 and a degree-of-modulation range that is higher than or equal to m3, and the effect amount of high-cut processing is varied in a degree-of-modulation range of m1 to m2 and a degree-of-modulation range of m2 to m3. In this example, in the degree-of-modulation range that is lower than or equal to m1, the effect amount is Y1 for middle-frequency-range-type tune and is Y2 for high-frequency-range-type tune (Y1<Y2). In the degree-of-modulation range that is higher than or equal to m3, the effect amount is Y5 for middle-frequency-range-type tune and is Y6 for high-frequency-range-type tune (Y5<Y6). For example, degrees of modulation m1, m2, and m3 may be set equal to 10, 30, and 50, respectively.

With the above-described control, when the degree of modulation is relatively low, the effect amount of high-cut processing is increased, whereby noise components can be attenuated reliably. When the degree of modulation is relatively high, the effect amount of high-cut processing is decreased, whereby the attenuation of musical sound components is suppressed. The sound quality can thus be enhanced.

Furthermore, when the CNR as the reception electric field strength is smaller than or equal to a prescribed value, the processing circuit 11 may set the effect amount of high-cut processing at a large constant value. For example, the processing circuit 11 may set the effect amount of high-cut processing at a constant value Y4 if the CNR value is smaller than or equal to R2 and at a constant value Y3 (Y3<Y4) if the CNR value is smaller than or equal to R1 (R2>R1).

In a state that the received electric field strength is low (weak electric field), the sound quality of a received audio signal is bad and noise components are dominant. When an audio signal whose electric field is weak is received, keeping the effect amount of high-cut processing at a prescribed value irrespective of the tune of the audio signal makes it possible to reduce noise reliably, providing an advantage of lowering the difficulty listening to an output sound due to noise.

When the noise level detected by the noise detector 18 is lower than a prescribed value, the processing circuit 11 controls the high-cut filtering device 15 so that it stops high-cut processing. With this measure, in an environment in which the reception state is good and the influence of noise is small, degradation of sound quality can be prevented by not performing high-cut processing.

The control of the effect amount of high-cut processing by the processing circuit 11 is performed at a prescribed cycle, for example. When the degree of modulation changes quickly, for example, when a change is made quickly from an audio signal a human voice for introduction of a musical piece title that is relatively low in the degree of modulation to an audio signal of the musical piece that is relatively high in the degree of modulation, the processing circuit 11 may perform a control so as to lower the effect amount of high-cut processing to a prescribed value for a prescribed time before completion of judgment of tune of the musical piece. As a result, the effect amount of high-cut processing can be lowered in a short time, whereby an event can be prevented that the sound quality is degraded by excessive high-cut processing from immediately after a start of the musical piece.

Figure 5:
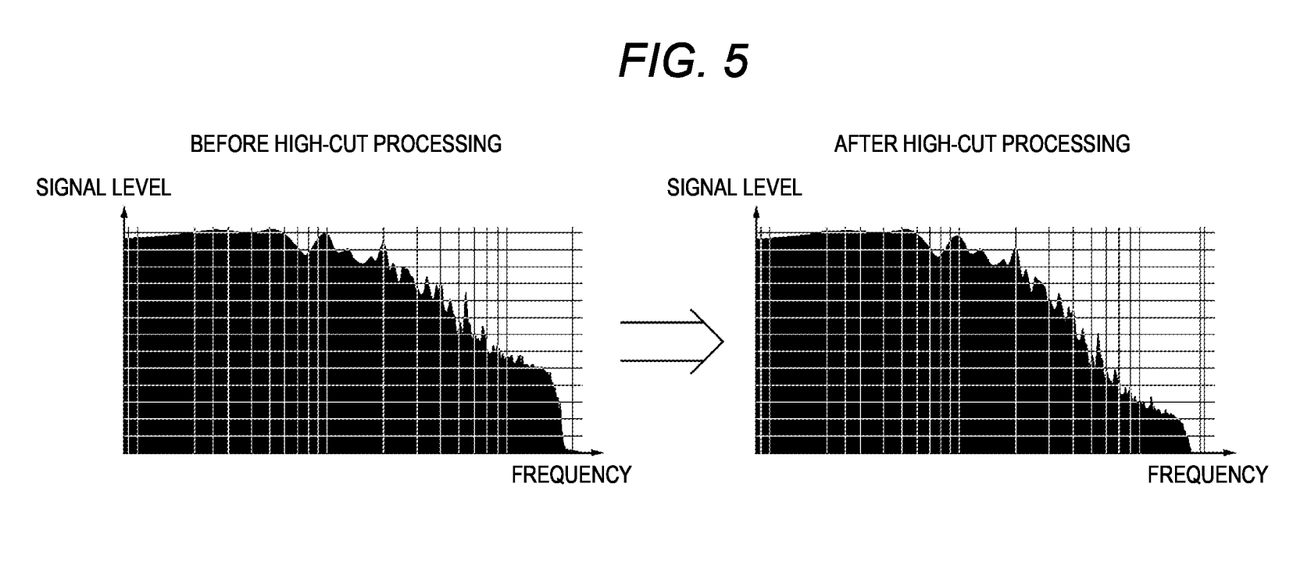
FIG. 5 is a characteristic diagram of example high-cut processing that is performed in the case of an audio signal having middle-frequency-range-type tune.
Figure 6:
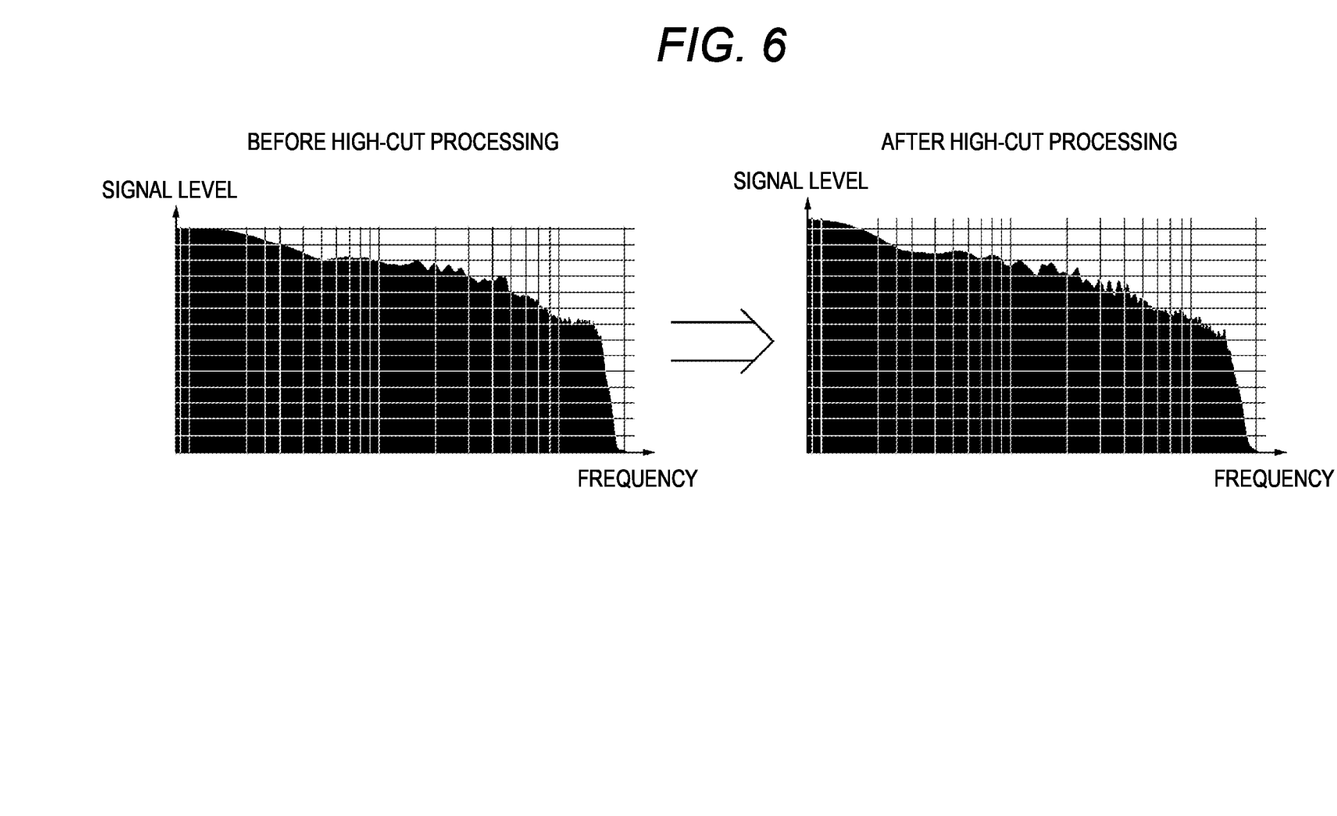
FIG. 6 is a characteristic diagram of example high-cut processing that is performed in the case of an audio signal having high-frequency-range-type tune.

Next, advantages of the high-cut processing employed in the embodiment will be described. FIG. 5 is a characteristic diagram of example high-cut processing that is performed in the case of an audio signal having middle-frequency-range-type tune. FIG. 6 is a characteristic diagram of example high-cut processing that is performed in the case of an audio signal having high-frequency-range-type tune. FIGS. 5 and 6 are for description of advantages of the embodiment and show how the frequency response of the high-cut processing is changed by the high-cut processing (horizontal axis: frequency; vertical axis: signal level). In each of FIGS. 5 and 6, the graph on the left side shows a frequency response before the high-cut processing and the graph on the right side shows a frequency response after the high-cut processing.

In the frequency response of the graph shown on left side in FIG. 5, the signal level of a high frequency component is lower than that of a middle frequency component to a relatively large extent. Because of such a level difference between the middle frequency component and the high frequency component, the processing circuit 11 judges that the audio signal has middle-frequency-range-type tune which is tune of classic music or the like. In this case, the processing circuit 11 sets the attenuation amount of high-cut processing relatively large. As a result, as shown in the graph shown on the right side in FIG. 5, the high frequency component is attenuated to a relatively large extent by the high-cut processing, whereby noise contained in the high frequency component is eliminated reliably. Since the proportion of musical sound components contained in the high frequency component is relatively small, the influence of the high-cut processing on the musical sound components is relatively small and hence almost no change occurs in the sound quality as recognized by the human auditory sense.

In the frequency response of the graph shown on left side in FIG. 6, the signal level of a high frequency component is kept relatively high and is not much smaller than that of a middle frequency component. Thus, the processing circuit 11 judges that the audio signal has high-frequency-range-type tune which is tune of pop music or the like by the level difference between the middle frequency component and the high frequency component. In this case, the processing circuit 11 sets the attenuation amount of high-cut processing relatively small. Thus, as shown in the graph shown on the right side in FIG. 6, the high frequency component is attenuated to a relatively small extent by the high-cut processing, whereby the attenuation of musical sound components contained in the high frequency component is suppressed. As a result, even if high-cut processing is performed, the influence on the musical sound components contained in the high frequency component is relatively small and hence almost no change occurs in the sound quality as recognized by the human auditory sense. Since the proportion of the musical sound components contained in the high frequency component is large, noise is made not conspicuous by the musical sound components even if a small amount of noise remains.

As described above, in the embodiment, the attenuation amount of high-cut processing is adjusted in accordance with the difference between signal levels of a middle frequency component and a high frequency component of a baseband audio signal of a received signal. As a result, noise can be reduced without impairing features (tune of a musical piece) of an audio signal being transmitted; noise reduction can be performed effectively.

As described above, in the receiving device according to the embodiment, the receiver 13 receives a broadcast signal including an audio signal and obtains a baseband signal of a received signal, and the demodulator 14 obtains the audio signal by demodulating the baseband signal. The middle frequency range detector 21 detects a signal level of a middle frequency component in a frequency range of the baseband signal, and the high frequency range detector 22 detects a signal level of a high frequency component in the frequency range of the baseband signal. The processing circuit 11 sets an effect amount of high-cut processing on the basis of a level difference between the signal level of the middle frequency component and the signal level of the high frequency component. The high-cut filtering device 15 performs the high-cut processing on the audio signal in accordance with a set value of the effect amount.

With this configuration, the effect amount of high-cut processing to be performed on the audio signal is made to correspond to the level difference between the signal levels of the middle frequency component and the high frequency component. The level difference indicates a feature (e.g., tune of a musical piece) of the audio signal being transmitted by a radio broadcast and the effect amount of high-cut processing is set in accordance with the feature of the audio signal. As a result, noise can be eliminated while necessary attenuation of the high frequency component is suppressed in accordance with the tune, whereby an audio signal whose sound quality is enhanced while its tune is maintained can be obtained as a reproduction signal of the received signal.

In the receiving device according to the embodiment, the processing circuit 11 decreases the effect amount if the level difference between the middle frequency component and the high frequency component is smaller than a prescribed value and increases the effect amount if the level difference is larger than the prescribed value. With this measure, for a musical piece having middle-frequency-range-type tune in which the signal level of a middle frequency component is clearly lower than that of a high frequency component, the effect amount of high-cut processing is increased, whereby noise can be eliminated effectively. In this case, influence on the sound quality is small because the proportion of musical sound components in the high frequency component is small. On the other hand, for a musical piece having high-frequency-range-type tune in which the signal level of a high frequency component is high like that of a middle frequency component, the effect amount of high-cut processing is decreased, whereby musical sound components in the high frequency component are attenuated excessively. In this case, noise is not conspicuous in the high frequency component because of a large proportion of the musical sound components. In these manners, a noise eliminating operation can be performed so as to be suitable for the feature of an audio signal (i.e., the tune of a musical piece).

The receiving device according to the embodiment is further equipped with the modulation degree detector 19 which detects the degree of modulation of the received signal. The processing circuit 11 sets the effect amount of high-cut processing in accordance with the detected degree of modulation. The processing circuit 11 changes the effect amount in accordance with the detected degree of modulation. For example, the processing circuit 11 decreases the effect amount if the degree of modulation is higher than a prescribed value, and increases the effect amount if the degree of modulation is lower than the prescribed value. With this measure, for an audio signal in which the degree of modulation is low and noise is conspicuous, the effect amount of high-cut processing is increased, whereby noise can be eliminated reliably. On the other hand, for an audio signal in which the degree of modulation is high and the proportion of noise is small, the effect amount of high-cut processing is decreased, whereby undue attenuation of musical sound components by the high-cut processing can be prevented and the sound quality can thereby be enhanced.

The receiving device according to the embodiment further includes the received field strength detector 20 which detects a received electric field strength of the received signal. The processing circuit 11 increases the effect amount of high-cut processing if the detected received electric field strength is smaller than a first prescribed value, and sets the effect amount at a prescribed constant value and keeps it if the detected received electric field strength is smaller than a second prescribed value. With this measure, when the electric field is weak, high-cut processing is performed forcibly with the prescribed effect amount, whereby the noise level in an output audio signal can be made low and hence listening in a poor reception environment can be less difficult.

The receiving device according to the embodiment further includes the noise detector 18 which detects a noise level of the received signal. And the processing circuit 11 stops the high-cut processing if the noise level is lower than a prescribed value. When the noise level is sufficiently low, it may not be necessary to lower the noise. This measure makes it possible to avoid performing high-cut processing in such a situation and to thereby suppress degradation of sound quality due to attenuation of musical sound components of an audio signal.

The receiving method according to the embodiment is a receiving method in the receiving device which receives a broadcast signal including an audio signal. The receiving method includes: receiving the broadcast signal and obtains a baseband signal of a received signal by the receiver 13; obtaining the audio signal by demodulating the baseband signal by the demodulator 14; detecting a signal level of a middle frequency component in a frequency range of the baseband signal by the middle frequency range detector 21; detecting a signal level of a high frequency component in the frequency range of the baseband signal by the high frequency range detector 22; setting an effect amount of high-cut processing on the basis of a level difference between the signal level of the middle frequency component and the signal level of the high frequency component by the processing circuit 11; and performing the high-cut processing on the audio signal in accordance with a set value of the effect amount by the high-cut filtering device 15. This receiving method can perform high-cut processing that is suitable for a feature of an audio signal, reduce noise while suppressing influence on the sound quality, and reproduce and output an audio signal in which sound quality degradation is suppressed.

Although the embodiment has been described above with reference to the drawings, it is to be appreciated that the invention is not limited to the embodiment. It is apparent that those skilled in the art could conceive various changes, modifications, replacements, additions, deletions, and equivalents within the confines of the claims, and it is understood that they are naturally within the technical scope of the invention. Furthermore, constituent elements of the above-described embodiment can be combined in a desired manner without departing from the spirit and scope of the invention.

The receiving device and the receiving method according to the disclosure are useful when applied as a receiving device and a receiving method capable of realizing high-cut processing for reducing noise while suppressing influence on sound quality.

This application is based on and claims priority from Japanese Patent Application No. 2018-232285 filed on Dec. 12, 2018, the entire contents of which are incorporated herein by reference.

The invention claimed is:

1. A receiving device comprising:
a receiver which receives a broadcast signal comprising an audio signal and obtains a baseband signal of a received signal;
a demodulator which obtains the audio signal by demodulating the baseband signal;
a middle frequency range detector which detects a signal level of a middle frequency component in a frequency range of the baseband signal;
a high frequency range detector which detects a signal level of a high frequency component in the frequency range of the baseband signal;
a processing circuit which sets an effect amount of high-cut processing based on a level difference between the signal level of the middle frequency component and the signal level of the high frequency component; and
a high-cut filtering device which performs the high-cut processing on the audio signal in accordance with a set value of the effect amount.

2. The receiving device according to claim 1, wherein the processing circuit decreases the effect amount if the level difference is smaller than a prescribed value.

3. The receiving device according to claim 1, wherein the processing circuit increases the effect amount if the level difference is larger than a prescribed value.

4. The receiving device according to claim 1, further comprising a modulation degree detector which detects a degree of modulation of the received signal,
wherein the processing circuit sets the effect amount based on the detected degree of modulation.

5. The receiving device according to claim 4, wherein the processing circuit decreases the effect amount if the degree of modulation is higher than a prescribed value.

6. The receiving device according to claim 4, wherein the processing circuit increases the effect amount if the degree of modulation is lower than a prescribed value.

7. The receiving device according to claim 1, further comprising a received field strength detector which detects a received electric field strength of the received signal,
wherein the processing circuit increases the effect amount if the received electric field strength is smaller than a first prescribed value.

8. The receiving device according to claim 7, wherein the processing circuit sets the effect amount at a prescribed constant value if the received electric field strength is smaller than a second prescribed value.

9. The receiving device according to claim 1, further comprising a noise detector which detects a noise level of the received signal,
wherein the processing circuit stops the high-cut processing if the noise level is lower than a prescribed value.

10. A receiving method in a receiving device which receives a broadcast signal comprising an audio signal, the receiving method comprising:
receiving the broadcast signal and obtaining a baseband signal of a received signal;
obtaining the audio signal by demodulating the baseband signal;
detecting a signal level of a middle frequency component in a frequency range of the baseband signal;
detecting a signal level of a high frequency component in the frequency range of the baseband signal;
setting an effect amount of high-cut processing based on a level difference between the signal level of the middle frequency component and the signal level of the high frequency component by a processing circuit; and
performing the high-cut processing on the audio signal in accordance with a set value of the effect amount by a high-cut filtering device.

* * * * *